(12) United States Patent
Murakami et al.

(10) Patent No.: US 7,927,004 B2
(45) Date of Patent: Apr. 19, 2011

(54) BACKLIGHT UNIT, AND A DISPLAY DEVICE INCLUDING THE SAME

(75) Inventors: Yoshihiro Murakami, Tsu (JP); Takeshi Ogura, Matsusaka (JP); Kazuki Nakamichi, Suzuka (JP); Takafumi Hara, Kyotanabe (JP); Takuya Ohnishi, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/722,829

(22) PCT Filed: Dec. 20, 2005

(86) PCT No.: PCT/JP2005/023388
§ 371 (c)(1),
(2), (4) Date: Jun. 26, 2007

(87) PCT Pub. No.: WO2006/070646
PCT Pub. Date: Jul. 6, 2006

(65) Prior Publication Data
US 2007/0285948 A1 Dec. 13, 2007

(30) Foreign Application Priority Data
Dec. 28, 2004 (JP) .................................. 2004-379347

(51) Int. Cl.
*F21V 7/04* (2006.01)
(52) U.S. Cl. ........................ 362/633; 362/634; 362/97.4
(58) Field of Classification Search .................... 362/97, 362/561, 632–634; 349/58
See application file for complete search history.

(56) References Cited

U.S. PATENT DOCUMENTS

| | | | | |
|---|---|---|---|---|
| 5,195,822 A * | 3/1993 | Takahashi et al. | ............ | 362/296 |
| 6,512,558 B2 * | 1/2003 | Kim | .................. | 349/58 |
| 6,929,392 B2 * | 8/2005 | Kim et al. | ..................... | 362/632 |
| 2002/0080298 A1 * | 6/2002 | Fukayama | ....................... | 349/58 |
| 2002/0149712 A1 * | 10/2002 | Kitamura et al. | .............. | 349/58 |
| 2003/0071933 A1 | 4/2003 | Ohta et al. | | |
| 2004/0057227 A1 * | 3/2004 | Yang et al. | ....................... | 362/31 |

(Continued)

FOREIGN PATENT DOCUMENTS

JP 4-81123 U 7/1992

(Continued)

OTHER PUBLICATIONS

Official Communication for PCT Application No. PCT/JP2005/023388; mailed on Feb. 28, 2006.

(Continued)

*Primary Examiner* — Julie A Shallenberger
(74) *Attorney, Agent, or Firm* — Keating & Bennett, LLP

(57) ABSTRACT

A backlight unit capable of being designed in consideration of both thermal expansion of optical sheets and positioning accuracy of the optical sheets on a backlight chassis. The backlight unit is arranged behind a display panel and includes a backlight chassis arranged to house a lamp, which includes a support surface arranged to support optical sheets, and a frame arranged to hold the optical sheets with the support surface of the backlight chassis, the optical sheets being interposed between the frame and the support surface, wherein the backlight chassis has, on its support surface, a positioning piece arranged to position the optical sheets at a predetermined position with respect to the support surface, and a position of the positioning piece corresponds to an approximate center of a longer edge of the optical sheets.

6 Claims, 6 Drawing Sheets

U.S. PATENT DOCUMENTS

| | | | |
|---|---|---|---|
| 2004/0109308 A1* | 6/2004 | Ho | 362/97 |
| 2005/0099604 A1 | 5/2005 | Mizumaki et al. | |
| 2005/0110920 A1* | 5/2005 | Harayama et al. | 349/61 |
| 2005/0212991 A1* | 9/2005 | Sugawara | 349/58 |
| 2006/0203519 A1* | 9/2006 | Shin et al. | 362/632 |
| 2007/0070650 A1* | 3/2007 | Chen et al. | 362/633 |
| 2008/0094855 A1* | 4/2008 | Yu et al. | 362/634 |

FOREIGN PATENT DOCUMENTS

| | | |
|---|---|---|
| JP | 11-306835 A | 11/1999 |
| JP | 2000-133006 A | 5/2000 |
| JP | 2002-279820 A | 9/2002 |
| JP | 2003-123502 A | 4/2003 |
| JP | 2003-203503 A | 7/2003 |
| JP | 2004-235103 A | 8/2004 |
| JP | 2004-342576 A | 12/2004 |

OTHER PUBLICATIONS

Hidetaka Mizumaki et al.; "Backlight Device and Liquid Crystal Display Device Therewith"; U.S. Appl. No. 10/980,662, filed Nov. 3, 2004.

* cited by examiner

BACKLIGHT UNIT, AND A DISPLAY DEVICE INCLUDING THE SAME

BACKGROUND OF THE INVENTION

1. Field of the Invention

The present invention relates to a backlight unit for housing a lamp that is a light source of a display device with a backlight, and specifically relates to a backlight unit preferably used in a liquid crystal display device including a translucent liquid crystal display panel.

2. Description of the Related Art

A liquid crystal display device including a translucent liquid crystal display panel and the like, which are cited as an example of a flat-screen display device, generally have a backlight unit arranged behind the liquid crystal display panel. The backlight unit is a device including a tubular lamp such as a cold cathode tube as a light source, which controls the properties of light emitted from the tubular lamp and projects the light toward a rear side of the display panel. The projected light passes through the display panel, making an image displayed visible on a front side of the display panel.

FIG. 5 is an exploded perspective view schematically illustrating relevant parts of a structure of a generally conventional liquid crystal display device. A liquid crystal display device 30 includes a bezel 31, a display panel 32 and a backlight unit 33. The bezel 31 is a member that defines a frame of the display panel 32, and the display panel 32 is made by bonding two panels of glass so as to seal in a liquid crystal therebetween.

The backlight unit 33 includes a frame 34, optical sheets 35, tubular lamps 36, a reflector 37 and a backlight chassis 38. The frame 34 is shaped like a picture frame and secures the optical sheets 35 to the backlight chassis 38. The optical sheets 35 are provided for controlling the properties of light which is emitted from the tubular lamps 36 and enters the display panel 32. In this case, the tubular lamps 36 are U-shaped, and left-side ends thereof are inserted into electrode part holders 41 so as to be secured to the backlight chassis 38 at the left-end positions, as shown in a plan view of FIG. 6. The reflector 37 is laid under the tubular lamps 36, for reflecting the light emitted from the tubular lamps 36 toward the display panel 32. In order to improve reflectivity, projections 37a having a crest shape are provided on the reflector 37 so as to be located respectively between tube sections 36a of the tubular lamps 36.

The backlight chassis 38, substantially in the shape of a box, has a lamp housing portion 38a including a bottom portion 38b and side-wall portions 38c and 38d, and support surfaces 38e and 38f extending outward respectively from upper edges of the side-wall portions 38c and 38d. In the backlight chassis 38, the bottom portion 38b and the longer side-wall portions 38c are formed of a member 39 which is prepared by subjecting a metal plate material to plate metal processing, and the shorter side-wall portions 38d are formed of a member 40 which is molded of resin.

The tubular lamp 36 is secured to the lamp housing portion 38a of the backlight chassis 38 with the use of the above-mentioned electrode part holder 41, and also with the use of a member 44 which includes lamp clips 42 for holding the tube section 36a at an approximate midpoint thereof, and a sheet holding pin 43 for preventing the optical sheets 35 which are arranged above from bending downward to preclude luminance irregularity, as illustrated. The member 44 including the lamp clips 42 and the sheet holding pin 43 is secured to the backlight chassis 38 by inserting and engaging protrusions 44a, which are provided beneath the member 44, into and with engaging holes 45 which are punched so as to be formed both in the reflector 37 and the bottom portion 38b, as shown in a detailed drawing in a circle in FIG. 5.

The above-mentioned frame 34 is secured to the support surfaces 38e and 38f of the backlight chassis 38 while interposing the optical sheets 35 and the reflector 37 therebetween. In this case, as shown in FIG. 6, protrusion portions 38g having a square shape are formed at the four corners of the support surfaces 38e and 38f, and concave portions 35a are formed as a notch at the four corners of the optical sheets 35. By fitting the protrusion portions 38g into the concave portions 35a, the optical sheets 35 are positioned on the support surfaces 38e and 38f.

Incidentally, as a prior art literature relating to the present invention, Japanese Patent Application Unexamined Publication No. Hei 11-306835 is cited.

In the above-described backlight unit 33, a thermal factor of the tubular lamp 36 that is the light source contributes to thermal expansion or thermal contraction of structural components thereof, and coefficients of thermal expansion and thermal contraction vary among the structural components. Therefore, friction develops at the time of thermal expansion or thermal contraction especially between the optical sheets 35, and the support surfaces 38e and 38f of the backlight chassis 38 and an interposition surface 34a of the frame 34 interposing the optical sheets 35 therebetween, which causes a problem of making a creaking sound.

In addition, as shown in FIG. 6, in a case where a gap H between the protrusion portion 38g of the backlight chassis 38 and the concave portion 35a of the optical sheets 35 which are used for positioning is set as clearance in consideration of a thermal expansion increment of the optical sheets 35 in use, the gap is too large at ambient temperatures during assembly of the backlight unit 33, so that positioning accuracy is not achieved. In contrast, in a case where the gap H is set in consideration of the positioning accuracy and without consideration of the gap H as clearance of the thermal expansion increment, the optical sheets 35 bend deeply because of no clearance, causing a creaking sound as described above or developing luminance irregularity.

SUMMARY OF THE INVENTION

In order to overcome the problems described above, preferred embodiments of the present invention provide a backlight unit that is capable of being designed in consideration of both thermal expansion of optical sheets and positioning accuracy of the optical sheets on a backlight chassis, and also provide a display device including such a backlight unit.

According to a preferred embodiment of the present invention, a backlight unit arranged behind a display panel includes a backlight chassis for housing a lamp, which includes a support surface arranged to support optical sheets, and a frame arranged to hold the optical sheets with the support surface of the backlight chassis, the optical sheets being interposed between the frame and the support surface, wherein the backlight chassis has, on its support surface, a positioning piece arranged to position the optical sheets at a predetermined position with respect to the support surface, and a position of the positioning piece corresponds to an approximate center of a longer edge of the optical sheets.

In this case, it is preferable that the positioning piece has a convex portion which fits into a concave portion formed as a notch at the approximate center of the longer edge of the optical sheets, or the positioning piece has a concave portion into which a convex portion formed as a projection at the approximate center of the longer edge of the optical sheets fits.

In addition, according to another preferred embodiment of the present invention, a backlight unit arranged behind a display panel includes a backlight chassis arranged to house a lamp, which includes a support surface arranged to support optical sheets, and a frame arranged to hold the optical sheets with the support surface of the backlight chassis, the optical sheets being interposed between the frame and the support surface, wherein the backlight chassis has contact portions which are formed as a projection on the support surface, the frame has contact portions which are formed as a projection on its interposition surface, and by the contact portions, the backlight chassis and the frame come into partial contact with outside surfaces of the optical sheets.

Further, it is preferable that the backlight chassis is made from a white color synthetic resin, and functions as a reflection surface to reflect light emitted from the lamp and let the light enter the display panel.

It is preferable that a display device includes the backlight unit.

According to the backlight unit having the above-described configurations, by using the unique configuration in which the backlight chassis has on its support surface the positioning piece arranged to position the optical sheets at the predetermined position with respect to the support surface and the position of the positioning piece corresponds to the approximate center of the longer edge of the optical sheets since a change in length of the optical sheets caused by thermal expansion is more significant in a longitudinal direction thereof, the backlight unit is capable of being designed in consideration of both thermal expansion of the optical sheets and positioning accuracy of the optical sheets on the backlight chassis.

In this case, by using the unique configuration in which the positioning piece has the convex portion which fits into the concave portion formed as a notch at the approximate center of the longer edge of the optical sheets, or the configuration in which the positioning piece has the concave portion into which the convex portion formed as a projection at the approximate center of the longer edge of the optical sheets fits, a structure for positioning is simplified.

In addition, by using the unique configuration in which the backlight chassis has the contact portions which are formed as a projection on the support surface and the frame has the contact portions which are formed as a projection on its interposition surface and by the contact portions the backlight chassis and the frame come into partial contact with the outside surfaces of the optical sheets, a contact area with the optical sheets can be decreased to prevent occurrence of a creaking sound due to friction.

Further, by using the configuration in which the backlight chassis is made from the white color synthetic resin and functions as the reflection surface to reflect the light emitted from the lamp and let the light enter the display panel, the need for separately providing a reflector as in the Related Art and the need for interposing it are eliminated, so that the contact portions which come into partial contact with the outside surfaces of the optical sheets are easily provided on the support surface of the backlight chassis.

By preparing a display device incorporating the backlight unit having the above-described configurations, the occurrence of a creaking sound during use can be prevented.

Other features, elements, characteristics and advantages of the present invention will become more apparent from the following detailed description of preferred embodiments with reference to the attached drawings.

DETAILED DESCRIPTION OF PREFERRED EMBODIMENTS

Figure 1:
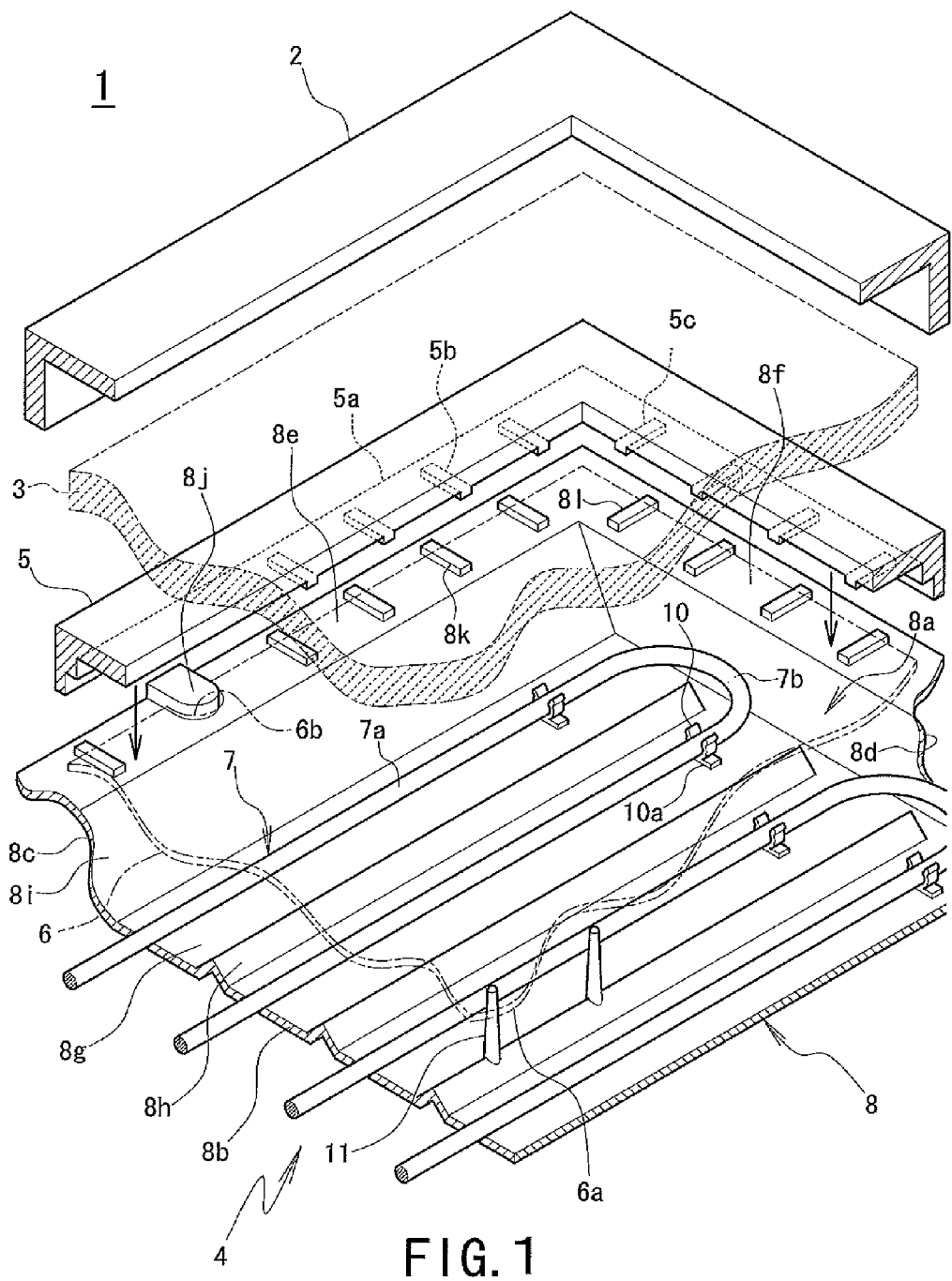
FIG. 1 is an exploded perspective view schematically illustrating a backlight unit included in a liquid crystal display device according to a preferred embodiment of the present invention.
Figure 2:
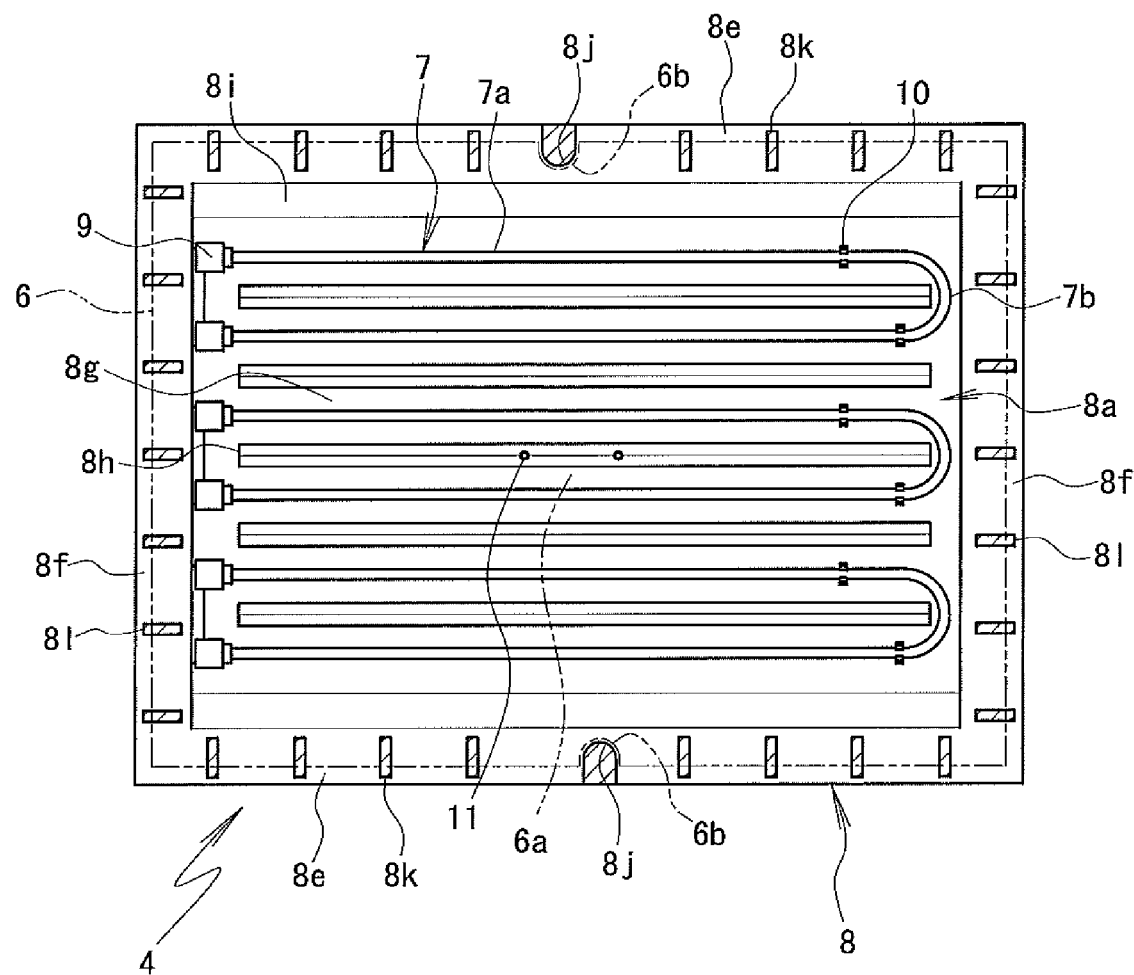
FIG. 2 is a top view showing the backlight unit shown in FIG. 1 in a state where a frame is removed.

A detailed description of a display device according to preferred embodiments of the present invention will now be given with reference to the accompanying drawings. FIG. 1 is an exploded perspective view schematically illustrating relevant parts of a structure of a liquid crystal display device according to preferred embodiments of the present invention. FIG. 2 is a top view showing the backlight unit shown in FIG. 1 in a state where a frame is removed. Besides, the exploded perspective view of FIG. 1 is an enlarged view of an upper right portion of the backlight unit of FIG. 2.

As shown in FIG. 1, a liquid crystal display device 1 includes a bezel 2, a display panel 3 and a backlight unit 4. The bezel 2 is a member defining a frame of the display panel 3, which protects the display panel 3 and ensures strength of the entire liquid crystal display device 1. The display panel 3 is made by bonding two panels of glass to seal in a liquid crystal therebetween.

The backlight unit 4 includes a frame 5, optical sheets 6, tubular lamps 7 and a backlight chassis 8. The frame 5 is preferably shaped like a picture frame and secures the optical sheets 6 to the backlight chassis 8. The optical sheets 6 are made by stacking members in the shape of a plate or sheet such as a diffusion plate, a diffusion sheet, a lens sheet and a polarizing reflection film in order to control the properties of light which is emitted from the tubular lamps 7 and enters the display panel 3. The tubular lamps 7 are preferably substantially U-shaped cold cathode tubes, and left-side ends thereof are inserted into electrode part holders 9 so as to be secured to the backlight chassis 8 at the left-end positions, as shown in FIG. 2.

The backlight chassis 8 is shaped like a box preferably made by molding a white color synthetic resin material, which has a lamp housing portion 8a including a bottom portion 8b, longer side-wall portions 8c and shorter side-wall portions 8d, and support surfaces 8e and 8f extending outward respectively from upper edges of the side-wall portions 8c and 8d. Incidentally, behind the backlight chassis 8, an inverter circuit board incorporating an inverter circuit to drive the tubular lamps 7 is installed, which is not illustrated. In addition, a rear surface of the backlight chassis 8 is subjected to light shielding treatment to be made black or the like, so that a leak of the light emitted from the tubular lamps 7 from the rear surface is prevented.

The lamp housing portion 8a is preferably made from the synthetic resin material of white color that is a color to reflect light most efficiently, so that a surface of the lamp housing portion 8a is configured as a reflection surface 8g having a function of reflecting the light emitted from the tubular lamps 7 toward the display panel 3. In addition, in order to further improve reflectivity, reflection crests 8h formed as a projection in a crest shape are provided on the reflection surface 8g so as to be located respectively between tube sections 7a of the tubular lamps 7. Likewise, in order to further improve reflectivity, the longer side-wall portions 8c of the lamp housing portion 8a have inclined surfaces 8i.

For securing the tubular lamps 7 to the lamp housing portion 8a, the electrode part holders 9 are provided as mentioned as above, and lamp clips 10 for holding the tube sections 7a at an approximate midpoint, in this case, in the vicinities of substantially U-shaped sections 7b, are provided while being molded in one piece with the backlight chassis 8, as illustrated. The tube sections 7a are held by the lamp clips 10 so as to leave a gap that is substantially equal to a thickness of a base 10a of the lamp clip 10 spaced from the reflection surface 8g.

In addition, to the center reflection crest 8h, sheet holding pins 11 are provided while being molded in one piece with the backlight chassis 8. The sheet holding pins 11 are used for preventing the optical sheets 6 which are arranged above the sheet holding pins 11 from bending downward to preclude luminance irregularity, and have a length so as to leave a predetermined space between the optical sheets 6 and the reflection surface 8g. In this case, the sheet holding pins 11 are formed in positions corresponding to a center portion 6a of the optical sheets 6.

The above-mentioned frame 5 is secured to the support surfaces 8e and 8f of the backlight chassis 8 while interposing the optical sheets 6 therebetween. In this case, a positioning piece 8j having a convex portion is formed as an arc-shaped projection at an approximate center of the longer support surface 8e, and corresponding to the convex portion of the positioning piece 8j, a concave portion 6b is formed as an arc-shaped notch at an approximate center of a longer edge of the optical sheets 6. By fitting the convex portion of the positioning piece 8j into the concave portion 6b, the optical sheets 6 are positioned on the support surfaces 8e and 8f.

In addition, on the support surfaces 8e and 8f of the backlight chassis 8, a plurality of contact portions 8k and a plurality of contact portions 8l having the shape of a rib are respectively arranged in longitudinal directions of the support surfaces 8e and 8f. In addition, as shown in FIG. 1, on an interposition surface 5a of the frame 5, a plurality of contact portions 5b and a plurality of contact portions 5c having the shape of a rib are respectively arranged in longitudinal directions of a longer side and a shorter side of the frame 5.

According to the backlight unit 4 having the above-described configuration, the optical sheets 6 are positioned on the backlight chassis 8 with respect to an approximately center position of the longer support surface 8e. Since a change in length of the optical sheets 6 caused by thermal expansion is more significant in a longitudinal direction thereof, by performing the positioning with respect to the approximate center position of the longer support surface 8e, the backlight unit 4 is made in consideration of both thermal expansion of the optical sheets 6 and positioning accuracy of the optical sheets 6 on the backlight chassis 8.

In addition, the backlight unit 4 is configured such that the support surfaces 8e and 8f of the backlight chassis 8 and the interposition surface 5a of the frame 5 come into partial contact with the optical sheets 6 while interposing the optical sheets 6 there between via the contact portions 8k, 8l, 5b and 5c formed as a projection. Therefore, a contact area with the optical sheets 6 can be decreased, which can prevent occurrence of a creaking sound by friction.

Further, since the backlight chassis 8 is preferably made from the white color synthetic resin and configured to function as the reflection surface 8g which reflects the light emitted from the tubular lamps 7 to let it enter the display panel 3, the need for separately providing a reflector as in the Related Art and the need for interposing it are eliminated. Therefore, the contact portions 8k which come into partial contact with the surface of the optical sheets 6 are easily provided on the support surface 8e of the backlight chassis 8, so that a structure thereof can be simplified.

Figure 3A:
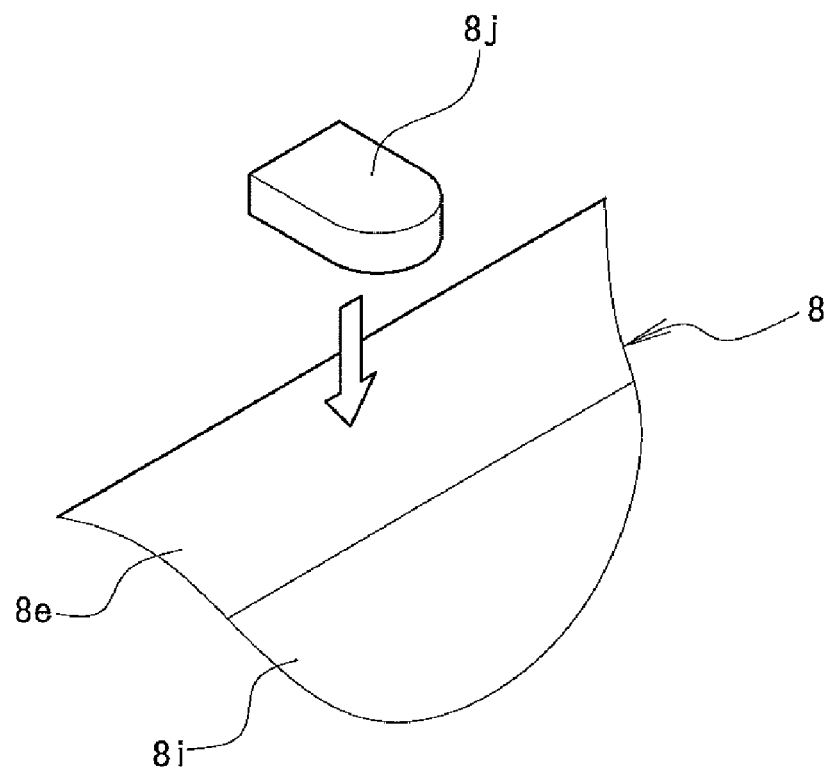
FIGS. 3A and 3B are views showing examples of configurations in which a positioning piece having a convex portion shown in FIG. 1 is provided separately from a backlight chassis.
Figure 3B:
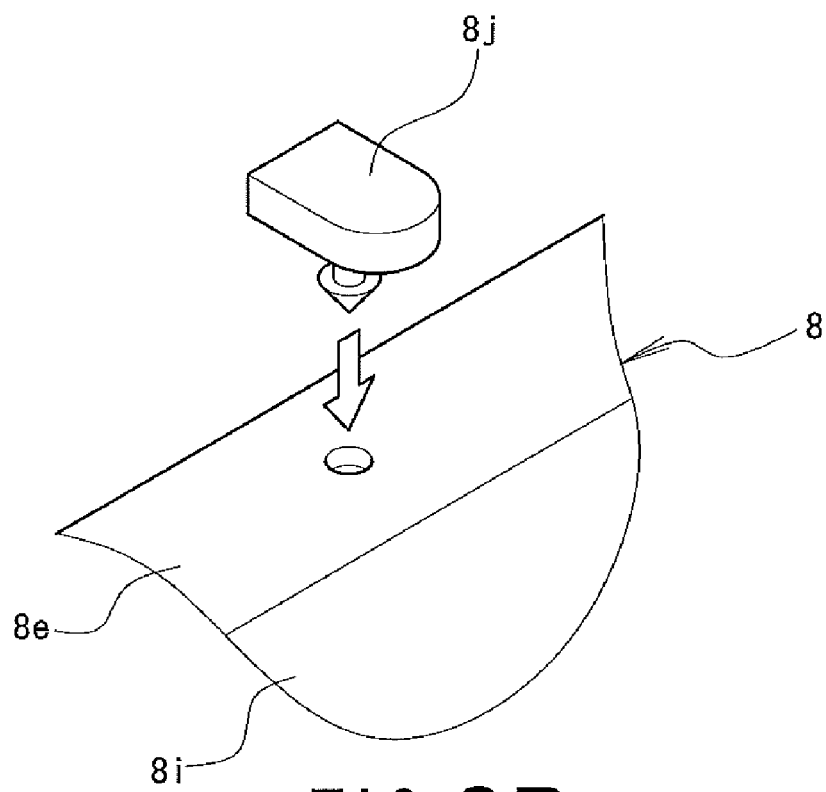

Incidentally, the positioning piece 8j may be provided separately from the backlight chassis 8. For example, the positioning piece 8j may be provided by bonding with the use of an adhesive on its undersurface as shown in FIG. 3A, or the positioning piece 8j may be provided by forming an engaging protrusion portion on its undersurface to be inserted into an engaging hole which is formed on the support surface 8e of the backlight chassis 8 as shown in FIG. 3B.

Figure 4:
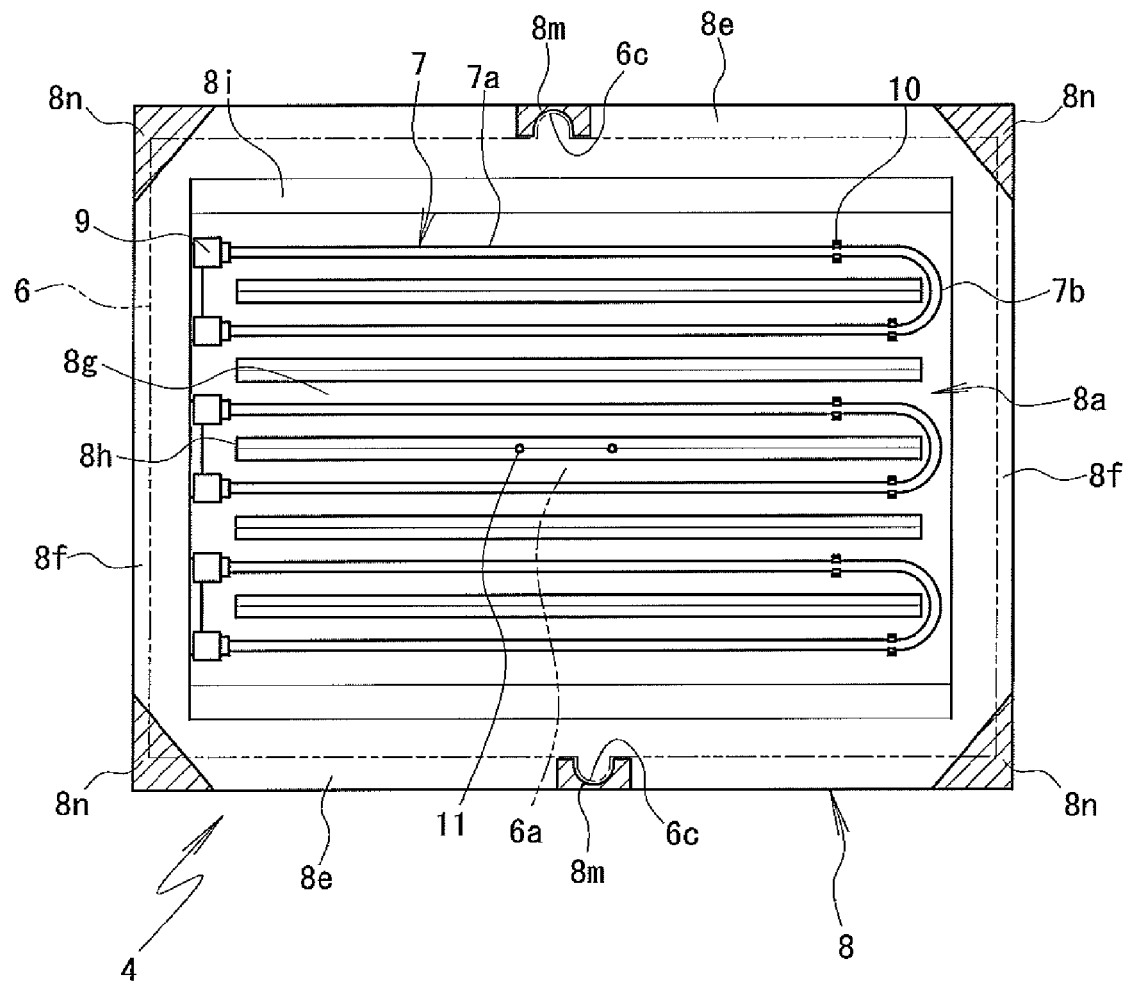
FIG. 4 is a view showing a modified example of the backlight unit shown in FIG. 1.
Figure 5:
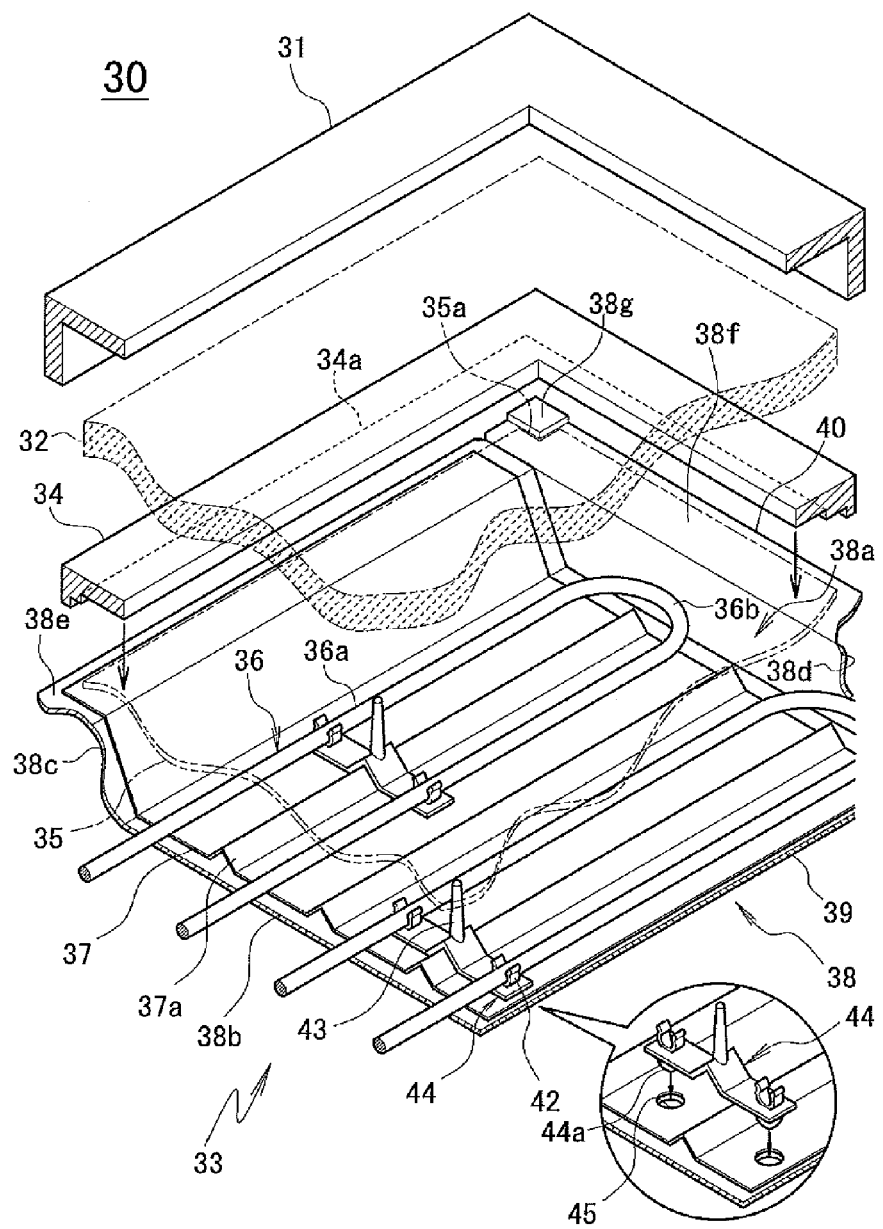
FIG. 5 is an exploded perspective view schematically illustrating a backlight unit of a conventional liquid crystal display device.
Figure 6:
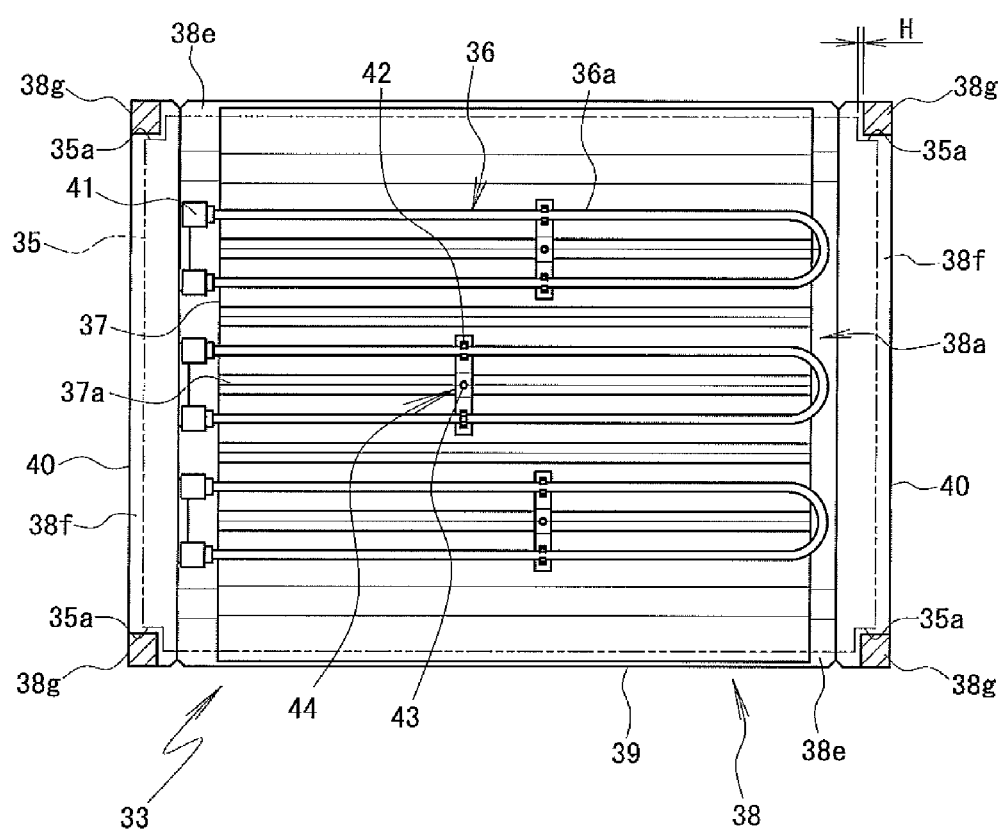
FIG. 6 is a top view showing the backlight unit shown in FIG. 5 in a state where a frame is removed.

Next, a detailed description of a liquid crystal display device according to another preferred embodiment of the present invention will be given with reference to FIG. 4. Incidentally, explanations of the same configurations as those in the above-mentioned preferred embodiment are omitted, and different respects are explained mainly, providing the same reference numerals as those in the above-mentioned preferred embodiment to the same structural components.

As illustrated, in this preferred embodiment, a positioning piece 8m having a concave portion is formed as an arc-shaped notch at the approximate center of the longer support surface 8e of the backlight chassis 8, and corresponding to the concave portion of the positioning piece 8m, a convex portion 6c is formed as an arc-shaped projection at the approximate center of the longer edge of the optical sheets 6. By fitting the convex portion 6c into the concave portion of the positioning piece 8m, the optical sheets 6 are positioned on the support surfaces 8e and 8f.

In addition, contact portions 8n having a substantially triangular shape are formed at the four corners of the support surfaces 8e and 8f of the backlight chassis 8, and corresponding contact portions having a substantially triangular shape are formed also on the interposition surface 5a of the frame 5, which are not illustrated. According to such a configuration, the optical sheets 6 are positioned on the backlight chassis 8 with respect to the approximately center position of the longer support surface 8e, and a contact area with the optical sheets 6 can be decreased owing to the contact portions 8n.

The foregoing description of preferred embodiments and the implementation example of the present invention has been presented for purposes of illustration and description with reference to the drawings. However, it is not intended to limit the present invention to the preferred embodiments, and modifications and variations are possible as long as they do not deviate from the principles of the present invention. For example, for the shape of the contact portions with the optical sheets, a variety of shapes such as a dome shape can be used instead of the above-described rib shape or substantially triangular shape, which is not limited to the above-described preferred embodiments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A backlight unit comprising:
    a backlight chassis arranged to house a lamp, which includes support surfaces at four edges that are arranged to support optical sheets; and
    a frame having a picture frame shape extending continuously along an entire outside periphery of the backlight chassis and arranged to hold the optical sheets with the support surfaces of the backlight chassis, the optical sheets being interposed between the frame and the support surfaces; wherein
    the backlight chassis includes:
        two positioning pieces arranged on its support surfaces to position the optical sheets at predetermined positions with respect to the support surfaces; and
        at least one projection on each of the support surfaces;
    positions of the positioning pieces correspond to approximate centers of two longer edges of the optical sheets;
    the frame has at least one projection on a surface of each of its four edges; and
    each of the at least one projection of the backlight chassis and of the at least one projection of the frame are in contact with a portion of a surface of the optical sheets that is arranged to oppose the backlight chassis, and the frame respectively, wherein at least one of the two positioning pieces has a convex portion which fits into a concave portion including a notch at the approximate center of the corresponding one of the two longer edges of the optical sheets.

2. The backlight unit according to claim 1, wherein at least one of the two positioning pieces has a convex portion including a projection at the approximate center of the corresponding one of the two longer edges of the optical sheets.

3. The backlight unit according to claim 1, wherein the backlight chassis is made from a white color synthetic resin, and defines a reflection surface to reflect light emitted from the lamp and let the light enter the display panel.

4. A display device comprising the backlight unit according to claim 1.

5. The backlight unit according to claim 1, wherein corresponding ones of the at least one projection of the backlight chassis and ones of the at least one projection of the frame are arranged to be opposed to each other at the same positions and to come into contact with the portion of the surface of the optical sheets that is arranged to oppose the backlight chassis, and the frame respectively.

6. The backlight unit according to claim 1, further comprising:
    a plurality of projections on each of the support surfaces of the backlight chassis arranged at regular intervals; and
    a plurality of projections on the surfaces of the four edges of the frame arranged at regular intervals.

* * * * *